United States Patent [19]
Goedken

[11] Patent Number: 5,166,596
[45] Date of Patent: Nov. 24, 1992

[54] BATTERY CHARGER HAVING VARIABLE-MAGNITUDE CHARGING CURRENT SOURCE

[75] Inventor: Terrance J. Goedken, Schaumburg, Ill.

[73] Assignee: Motorola, Inc., Schaumburg, Ill.

[21] Appl. No.: 751,938

[22] Filed: Aug. 29, 1991

[51] Int. Cl.⁵ .............................................. H02J 7/04
[52] U.S. Cl. .......................................... 320/35; 320/24
[58] Field of Search ............... 320/24, 35, 31; 455/89, 455/90

[56] References Cited

U.S. PATENT DOCUMENTS

| | | | |
|---|---|---|---|
| 4,006,397 | 2/1977 | Catotti et al. | 320/31 |
| 4,045,720 | 8/1977 | Alexandres | 320/35 |
| 4,670,703 | 6/1987 | Williams | 320/22 |
| 4,692,682 | 9/1987 | Lane et al. | 320/35 |
| 4,712,055 | 12/1987 | Houser, Jr. | 320/35 |
| 4,727,306 | 2/1988 | Misak et al. | 320/35 |
| 4,843,299 | 6/1989 | Hutchings | 320/31 |
| 5,057,762 | 10/1991 | Goedken et al. | 320/15 |

*Primary Examiner*—Steven L. Stephan
*Assistant Examiner*—Adolf Berhane
*Attorney, Agent, or Firm*—Robert H. Kelly

[57] ABSTRACT

A battery charger for charging a nickel metal hydride battery with a fast charging current. The battery charger is operative to step-down, or constantly reduce, the magnitude of a charging current applied to a nickel metal hydride battery as the temperature level of the battery increases during charging thereof. As the temperature levels of the battery exceeds preset values, the magnitude of the charging current is reduced. When the temperature levels of the battery exceeds a maximum value, application of a fast charging current is terminated, and a trickle charging current is applied to the battery.

21 Claims, 6 Drawing Sheets

BATTERY CHARGER HAVING VARIABLE-MAGNITUDE CHARGING CURRENT SOURCE

BACKGROUND OF THE INVENTION

The present invention relates generally to battery charging systems, and, more particularly, to a battery charger operative to apply a charging current to a battery of a magnitude determined by the temperature level of the battery.

Oftentimes, an electrical device is constructed to be of a design to permit powering thereof by one or more batteries. In some instances, the use of a battery to power the electrical device is necessary when the electrical device is not, or cannot be, positioned proximate to a permanent power supply. In other instances, a battery is used to power the electrical device to increase the portability of the device, as no power cable is required to interconnect the electrical device to a permanent, power supply. Typically, the one or more batteries used to power the electrical device are carried directly with the electrical device.

However, because a battery stores only a finite amount of energy, operation of the electrical device is limited by the energy storage capacity of the battery. Powering of the electrical device by the battery discharges the battery, and, once the battery becomes discharged, replacement of the battery is required to permit continued operation of the electrical device. Increasing the size (and weight) of the battery, while increasing the energy storage capacity of the battery, reduces the portability of the electrical device when the battery is carried therewith. Accordingly, a compromise is made between increased battery energy storage capacity and reduced portability of the electrical device.

A portable or transportable radio telephone is one such electrical device which is typically powered by a battery power supply. The battery power supply is typically carried directly with the radio telephone, and is of size and weight which does not unduly constrain the portability of the radio telephone.

When the radio telephone is operative to send or to receive a modulated signal, the radio telephone typically dissipates power at a rate of up to three watts. Conventional battery power supplies constructed to power such radio telephones are of energy storage capacities permitting power dissipation at such a rate (i.e., operation of the radio telephone) for approximately a one hour time period. If the battery power supply operative to power the radio telephone is not initially fully charged, the operational period during which the radio telephone may be operated at such a power level is, of course, commensurately reduced.

Once the battery power supply has been discharged beneath a certain level, the battery powering the radio telephone must be removed and replaced with a new battery power supply to permit continued operation of the radio telephone.

Rechargeable batteries have been developed and are commercially available. Some of such commercially-available, rechargeable batteries are of constructions designed for use to power radio telephones. The use of rechargeable batteries is advantageous as, after discharge of the batteries, the rechargeable batteries may be recharged, and then reused. Some constructions of rechargeable batteries may be recharged, and reused, up to, and even in excess of, five hundred times.

A rechargeable battery construction used to power a portable radio telephone is typically comprised of several discrete battery cells, connected in a series (or other) connection, and housed within a common housing. The housing, together with the battery cells, is sometimes referred to as a battery pack. For purposes of simplicity, such constructions are most times referred to simply by the term "battery". The instant disclosure utilizes such simplified terminology except when, as shall be noticed hereinbelow, the more precise terminology is required.

Rechargeable battery constructions are comprised of various different materials of construction. For instance, a rechargeable battery may be comprised of a lithium (Li), material, a nickel-cadmium (Ni-Cd) material, or a nickel metal hydride ($NiMHO_2$) material. Batteries constructed of these different materials of construction exhibit different characteristics during recharging thereof.

Battery charging apparatus is also commercially available to permit recharging of rechargeable batteries. A battery charger comprising such battery charging apparatus is typically comprised of support structure for supporting one or more batteries, and a current source for supplying a charging current which charges the rechargeable battery when suitably positioned upon the support structure. The energy of the charging current applied to the rechargeable battery is converted into chemical energy which is stored by the battery. Application of the charging current to the rechargeable battery over an elapsed period of time permits the rechargeable battery to become fully recharged. The time period required to charge fully the rechargeable battery is dependent upon the battery type, the extent to which the battery has been discharged, and the magnitude of the charging current applied to the battery. Certain battery chargers are of constructions which supply a relatively small magnitude current (such as, for example, a C/10 value wherein C is the one-hour capacity of a battery) to the battery, and battery chargers of other constructions supply a significantly larger current (such as, for example, a C value) to the battery. Application of the large magnitude current to the battery is referred to as fast charging of the battery. Application of the small magnitude current to the battery is referred to as trickle charging of the battery. Several battery chargers are of constructions which permit the application of either the large current (i.e., the fast charging current) or the relatively small current to the battery to recharge the battery thereby.

As the time required to recharge a rechargeable battery is reduced when a large-magnitude charging current is applied to the battery to recharge the battery thereby, charging of the rechargeable battery by the application of a fast charging current thereto is advantageous for reasons of convenience. However, application of the fast charging current to the rechargeable battery causes the temperature of the battery to increase.

A nickel metal hydride battery, in particular, exhibits a rapid temperature increase when a fast charging current is applied to the battery to charge the battery thereby. Many conventional constructions of battery chargers terminate the application of a fast charging current to a rechargeable battery when the temperature level of the battery exceeds a predetermined, threshold value. When applying a fast charging current to a nickel-cadmium battery, the battery typically exhibits a rapid temperature increase only when the battery is, or is almost, fully charged. As a nickel metal hydride battery exhibits a rapid temperature increase prior to complete charging of the battery, application of a fast charging current to a nickel metal hydride battery in such a conventional battery charger would result in termination of the application of the fast charging current to the battery soon after application of the fast charging current commences, and prior to adequate charging of the battery.

Also, a nickel-cadmium battery typically exhibits a voltage drop across output terminals thereof upon complete charging thereof. Accordingly, other conventional battery chargers are of constructions which apply a fast charging current to a battery positioned to be charged thereat until continued application of the fast charging current to the battery results in a voltage decrease across output terminals of the battery. However, when the battery positioned to be recharged is comprised of a nickel metal hydride material, continued application of the fast charging current until the battery exhibits a voltage drop thereacross, would result in excessive temperature levels of the battery undergoing recharging.

Also, when a battery is permitted to be elevated repeatedly to excessive temperature levels, the battery may become damaged, or the battery life of the battery may be reduced.

What is needed, therefore, is a battery charger of a construction operative to apply a fast charging current to a nickel metal hydride battery to charge fully the battery, but which prevents excessive temperature increase of the nickel metal hydride battery during application of the fast charging current thereto.

As a user of a radio telephone may use a rechargeable battery of a nickel-cadmium construction in some instances, and a rechargeable battery of a nickel metal hydride construction in other instances, a battery charger of a construction permitting fast charging of a rechargeable battery of either type of construction would be advantageous.

What is additionally needed, therefore, is a battery charger of a construction operative to apply a fast charging current to a rechargeable battery comprised of either a nickel-cadmium material or a nickel metal hydride material.

SUMMARY OF THE INVENTION

The present invention, therefore, advantageously provides a battery charger of a construction operative to apply a fast charging current to a nickel metal hydride battery to charge fully the battery, but which prevents excessive temperature increase of the battery during application of the fast charging current thereto.

The present invention further advantageously provides a battery charger operative to apply a fast charging current to a nickel cadmium battery to charge fully the battery.

The present invention yet further advantageously provides a method for applying a fast charging current to a rechargeable battery.

The present invention provides further advantages and features, the details of which will become more evident by reading the detailed description hereinbelow.

In accordance with the present invention, therefore, a battery charger for charging a battery formed of at least one battery cell when positioned thereat is disclosed. The temperature level of the at least one battery is measured. When the temperature level of the at least one battery is less than a first threshold temperature, a battery charging current defined by a current level is applied to the at least one battery. When the temperature level of the at least one battery exceeds the first threshold temperature, the current level of the battery charging current applied to the at least one battery is reduced. When the temperature level of the at least one battery exceeds a second threshold temperature, a trickle charging current is applied to the at least one battery.

BRIEF DESCRIPTION OF THE DRAWINGS

The present invention will be better understood when read in light of the accompanying drawings in which.

DETAILED DESCRIPTION OF THE PREFERRED EMBODIMENTS

Figure 1:
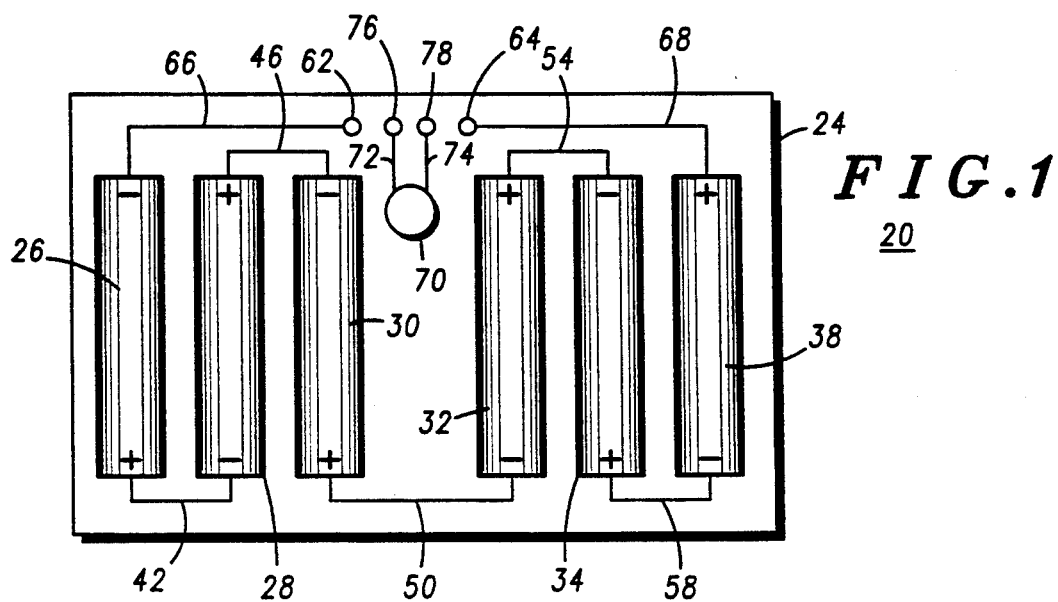
FIG. 1 is a partial circuit, partial schematic diagram of a battery pack formed of six discrete battery cells connected in a series connection therebetween.

Referring first to the partial circuit, partial schematic diagram of FIG. 1, a battery pack, referred to generally by reference numeral 20, is shown. Battery pack 20 is comprised of housing 24 which is of a construction permitting supportive housing of battery cells therein. Battery pack 20 of FIG. 1 is comprised of six battery cells 26, 28, 30, 32, 34, and 38. Battery cells 26-38 are of constructions to permit recharging thereof by application of a fast charging current thereto, and are here preferably comprised of either a nickel-cadmium material or a nickel metal hydride material, as above described. Battery cells comprised of other materials are similarly possible.

As indicated in the Figure, each battery cell 26-38 is bipolar in construction, and is formed of a cathodic portion (indicated by plus signs at first sides of each of the cells 26-38), and an anodic portion (indicated by minus signs at second sides of each of the cells 26-38). A first side of battery cell 26 is coupled to a second side of battery cell 28 by connector 42; a first side of battery cell 28 is coupled to a second side of battery cell 30 by connector 46; a first side of battery cell 30 is coupled to a second side of battery cell 32 by connector 50; a first side of battery cell 32 is coupled to a second side of battery cell 34 by connector 54; and a first side of battery cell 34 is coupled to a second side of battery cell 38 by connector 58. Output terminals 62 and 64 are coupled to sides of battery cells 26 and 38 by connectors 66 and 68, respectively. Output terminals 62 and 64 form electrical contacts suitable for connection to an electrical device, such as a radio telephone, to power the device with the stored energy of cells 26-38 of battery pack 20.

Battery packs comprised of other numbers of battery cells (and other configurations thereof—i.e., series or parallel connections of the battery cells) include connectors for coupling the battery cells theretogether as necessary. Although battery cells 26-38 of FIG. 1 are configured in a series connection, cells 26-38 may be alternately configured in a parallel connection, or a combination of parallel and series connections. The number of battery cells and their respective connections theretogether is dependent upon the construction of the battery cells utilized and the voltage and current requirements of the electrical device powered by the battery pack.

Battery pack 20 further includes thermistor 70 having leads 72 and 74 coupled to electrodes 76 and 78, respectively. Because thermistor 70 is housed within housing 24 of the battery pack, thermistor 70 is operative to provide indications of the temperature levels of the battery cells, here cells 26-38, of battery pack 20. As mentioned hereinabove, during application of a fast charging current to the battery cells of the battery pack to recharge the battery cells thereby, the temperature levels of the battery cells also increase. The rate of increase of such temperature levels, while generally proportional to the magnitude of the fast charging current applied to the battery cells, is particularly significant when the battery cells are comprised of the nickel metal hydride material.

When battery cells 26-38 are comprised of the nickel metal hydride material, and configured in a manner similar to that of battery pack 20 of FIG. 1, a potential difference of approximately 10 volts may be formed across terminals 62 and 64 if each cell 26-38 is fully charged. When battery cells 26-38 are comprised of a nickel-cadmium material, a similar level of potential difference may be formed across terminals 62 and 64.

Figure 2:
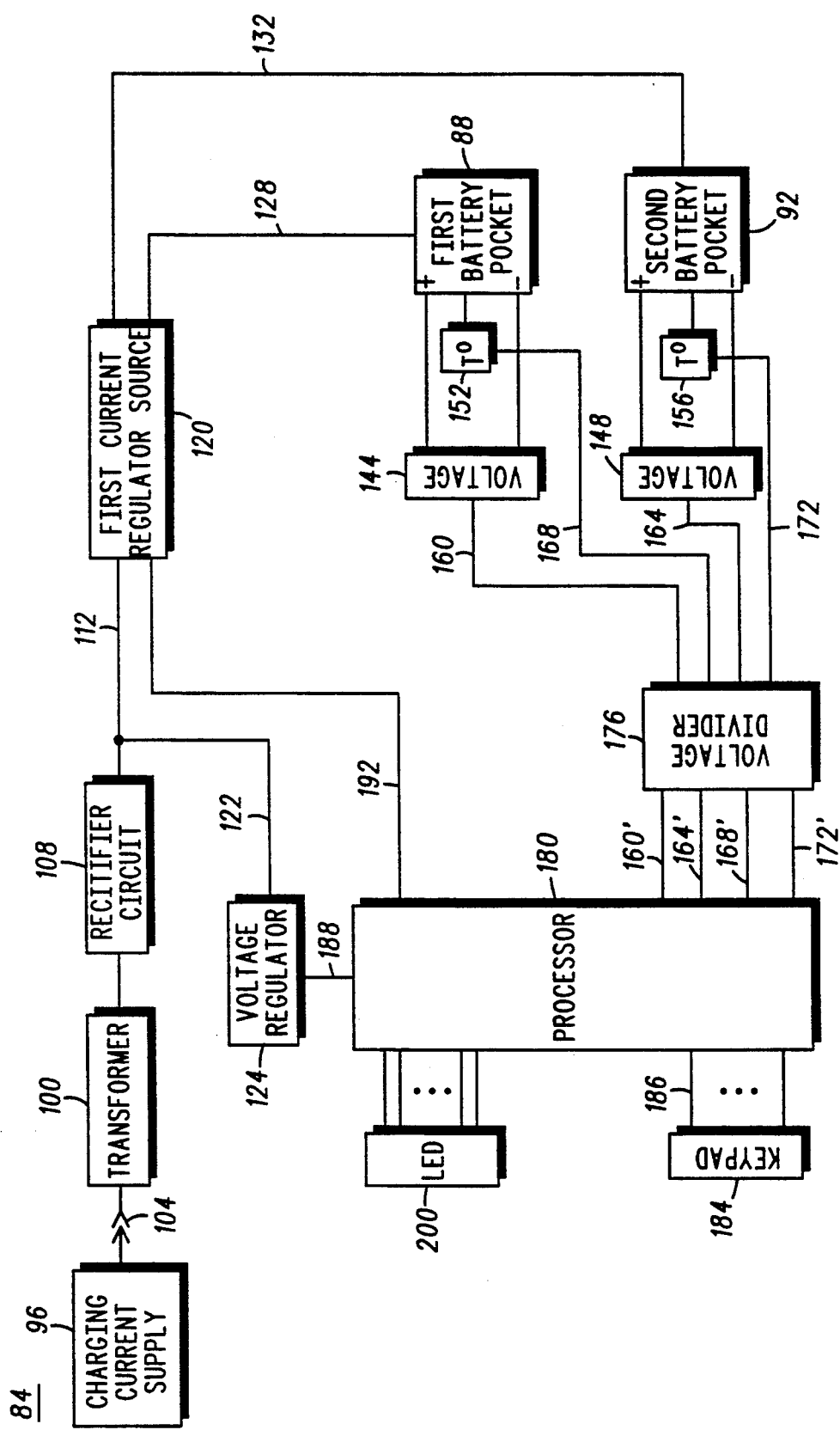
FIG. 2 is a block diagram of a circuit comprising the battery charger of a preferred embodiment of the present invention.

Turning now to the block diagram of FIG. 2, a circuit, referred to generally by reference numeral 84, of the battery charger of a preferred embodiment of the present invention is shown. Circuit 84 is operative to apply a fast charging current to a battery pack, such as battery pack 20 of FIG. 1, while avoiding the rapid temperature increase which occurs during such application of the fast charging current to the battery pack. As such temperature increase is particularly significant when the battery cells of the battery pack are comprised of the nickel metal hydride material, use of a battery charger encompassing circuit 84 is particularly advantageous to recharge battery cells comprised of the nickel metal hydride material. A battery charger encompassing circuit 84 may, however, also be advantageously utilized to recharge battery cells comprised of a nickel cadmium, or other, material.

As mentioned hereinabove, several battery charger constructions of conventional design terminate the application of a fast charging current to a battery when the temperature levels of the battery exceed a threshold value. Because of the particularly rapid temperature increase of nickel metal hydride batteries responsive to application of a fast charging current thereto, the temperature levels of nickel metal hydride batteries undergoing recharging by such battery charger constructions typically exceed the threshold value which causes termination of application of the fast charging current soon after initiation of application of the fast charging current. Such premature charge termination prevents the complete charging of the nickel metal hydride batteries.

Several other battery charger constructions of conventional design terminate application of a fast charging current to a battery upon detection of a voltage decrease at least as great as a predetermined magnitude across output terminals of the battery. Such voltage decrease across the output terminals of the battery typically only occurs upon complete charging of the battery. As batteries comprised of the nickel metal hydride material exhibit a particularly rapid rate of temperature level increase during application of a fast charging current thereto, continued application of the fast charging current to such nickel metal hydride batteries until the batteries are fully charged (and a voltage level decrease greater than the predetermined magnitude) can result in the temperature levels of the batteries becoming excessively high. Such excessive temperature levels can result in damage to the batteries or reductions in their useful lifes.

It is to be noted that, while circuit 84 illustrated in FIG. 2 permits recharging of two battery packs (battery charging apparatus encompassing the illustrated circuit is frequently referred to as a "two-pocket" battery charger), a battery charger of the present invention may also be configured to permit recharging of other numbers of battery packs.

It is further noted that, while the following detailed description is directed primarily to the charging of a nickel metal hydride battery, that a battery charger encompassing circuit 84 is similarly operative to apply a fast charging current to batteries comprised of a nickel-cadmium material.

Therefore, while circuit 84 of FIG. 2 comprises first battery pocket 88 and second battery pocket 92, circuit 84 may alternately be comprised of only a single battery pocket 88 or 92, or additional numbers of battery pockets.

Pockets 88 and 92 are electrically connected, as will be described in greater detail hereinbelow, to receive current generated by charging current supply 96. Supply 96 may be comprised, for example, of a conventional, AC power supply, such as a power supply formed by a conventional, household, electrical outlet. Charging current supply 96, may, alternately, be comprised of a DC power supply, such as an automobile battery and/or generator.

A primary side of transformer 100 is coupled to receive the current of charging current supply 96. When charging current supply 96 is comprised of the conventional, household electrical outlet (which supplies a conventional, household, alternating current), transformer 100 is connected to supply 96 by conventional, pronged connectors suitable for insertion into the electrical outlet. Such is indicated in the figure by connector 104. When charging current supply 96 is comprised of an automobile battery/generator (which supplies a direct current), connector 104 may be comprised of a plug suitable for insertion into a cigarette lighter socket of an automobile passenger compartment.

In embodiments in which battery charger 84 is supplied with an alternating-current, a secondary side of transformer 100 is coupled to rectifier circuit 108. Rectifier circuit 108 rectifies, and preferably, additionally converts the rectified signal to a direct current signal. (When charging current supply 96 is comprised of a direct current source, such as, e.g., the automobile battery/generator, transformer 100 and rectifier circuit 108 may not be required.)

The rectified signal generated by rectifier circuit 108 is supplied on line 112 to current regulator 120, and on line 122 to voltage regulator 124. (When neither transformer 100 nor rectifier circuit 108 are required, the charging current generated by current supply 96 may be directly coupled to regulators 120 and 124.)

Current regulator 120 is a variable current regulator which is operative to generate a current on lines 128 and 132 of any desired current level within a range of allowable current levels. Lines 128 and 132 are coupled to terminals formed at first and second battery pockets 88 and 92, respectively. The current level of the current generated on lines 128 and 132 by current regulator 120 may be of a level corresponding to a fast charging current, or a trickle charging current. As a fast charging current is defined to be a current of a magnitude in excess of a predetermined level, a fast charging current may be of any of many levels.

Application of the charging current, when either of a level corresponding to a fast charging current or a trickle charging current, occurs after a battery pack is suitably positioned such that output terminals thereof (such as output terminals 62 and 64 of battery pack 20 of FIG. 1) are electrically connected to terminals formed at the battery charging pockets 88 and/or 92 thereby to permit the battery cells of the battery pack to be recharged.

As mentioned previously, because application of a fast charging current to a battery allows the battery to be recharged in a relatively short period of time, recharging of a battery by application of the fast charging current is generally advantageous. However, when the battery cells of the battery pack are comprised of a nickel metal hydride material, during application of the fast charging current to the battery cells, a particularly rapid increase in the temperature levels of the battery also occurs.

Voltage measuring apparatus 144 is appropriately coupled across the terminals of first battery pocket 88 to permit measurement of voltage levels across output terminals of a battery pack (such as across output terminals 62 and 64 of battery pack 26 of FIG. 1) when a battery is suitably positioned at pocket 88. Similarly, voltage measuring apparatus 148 is appropriately coupled across the terminals of second battery pocket 92 to permit measurement of the voltage across output terminals of a battery suitably positioned at pocket 92.

Additionally, temperature measuring apparatus 152 is positioned proximate to first battery pocket 88 to permit measurement of the temperature level of a battery positioned at first battery pocket 88. When the battery positioned at the battery pocket is similar to battery pack 20 of FIG. 1 which includes a thermistor, such as thermistor 70, therein, temperature measuring apparatus 152 merely comprises electrodes suitable for electrical connection to corresponding electrodes formed upon the battery pack positioned at battery pocket 88, such as electrodes 76 and 78 of battery pack 20 shown in FIG. 1. Similarly, temperature measuring apparatus 156 is positioned proximate to second battery pocket 92 to permit measurement of the temperature levels of a battery positioned at pocket 92. In other embodiments, temperature measuring apparatus 152 and 156 may itself comprise a thermistor or other temperature-measuring device.

Signals indicative of the voltage levels measured by voltage measuring apparatus 144 and 148 are generated on lines 160 and 164, respectively. Signals indicative of the temperature levels of the batteries positioned at first battery pocket and second battery pocket 88 and 92, are generated by temperature measuring apparatus 152 and 156 on lines 168 and 172, respectively. Lines 160-172 are coupled to voltage divider 176 which is operative to convert the values of the signals supplied thereto on lines 160, 164, 168, and 172 into signals on lines 160', 164', 168' and 172' of signal levels suitable for input processor 180.

Processor 180 additionally receives input signals generated by keypad 184 on lines 186, and processor 180 is powered by a voltage regulated signal generated by voltage regulator 124 on line 188. Processor 180 may, of course, receive additional input signals generated by other sources to perform other functions.

Processor 180 generates output signals on line 192 which is coupled to current regulator 120. Signals generated on line 192 are operative to control the magnitude of the current level of the current generated by current regulator 120 on lines 128 and 132. Processor 180 additionally generates other output signals, including, for example, output signals to power indicating devices such as light emitting diodes 200.

Figure 3:
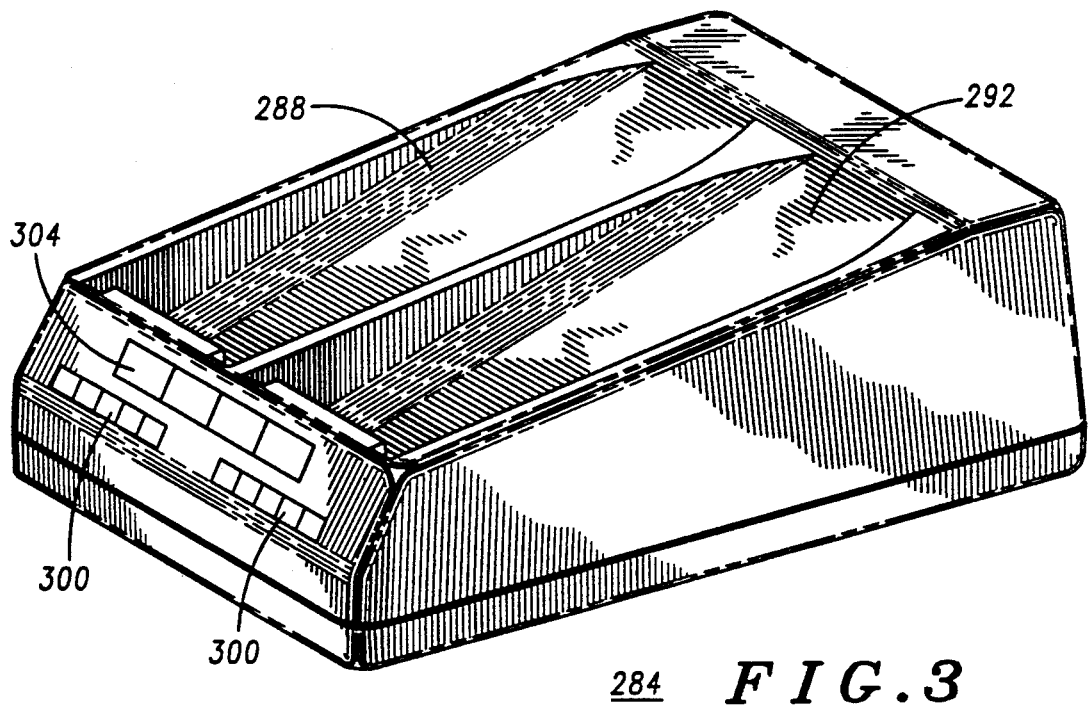
FIG. 3 is an perspective view of a battery charger constructed according to the teachings of a preferred embodiment of the present invention encompassing the circuit of FIG. 2.

Turning now to the perspective illustration of FIG. 3, a battery charger, here referred to generally by reference numeral 284, is shown. Battery charger 284 includes circuitry 84 shown in the block diagram of FIG. 2. Battery charger 284 includes two battery charging pockets 288 and 292 which correspond to first and second battery pockets 88 and 92 of the block diagram of FIG. 2. Charging pockets 288 and 292 are formed upon a top surface of the housing of battery charger 284. While not shown in the figure, electrical terminals formed of electrodes are also formed at each of the battery pockets. The electrical terminals provide the electrical connections permitting electrical connection of battery packs (such as battery packs similar in construction to battery pack 20 FIG. 1) positioned at pockets 288 or 292 to receive charging currents supplied thereto and to provide electrical connection between thermistors contained within the battery packs and temperature measuring apparatus of the battery charger, such as temperature measuring apparatus 152 and 156 shown in the block diagram of FIG. 2.

Other portions of the circuit 84 shown in block form in FIG. 2 may be supported within the housing of charger 284. Light emitting diodes 300, which correspond to light emitting diodes 200 of FIG. 2, and keypad 304 which corresponds to the keypad 184 of FIG. 2, are additionally shown in the figure to be positioned upon a face surface of the housing of charger 284.

Figure 4:
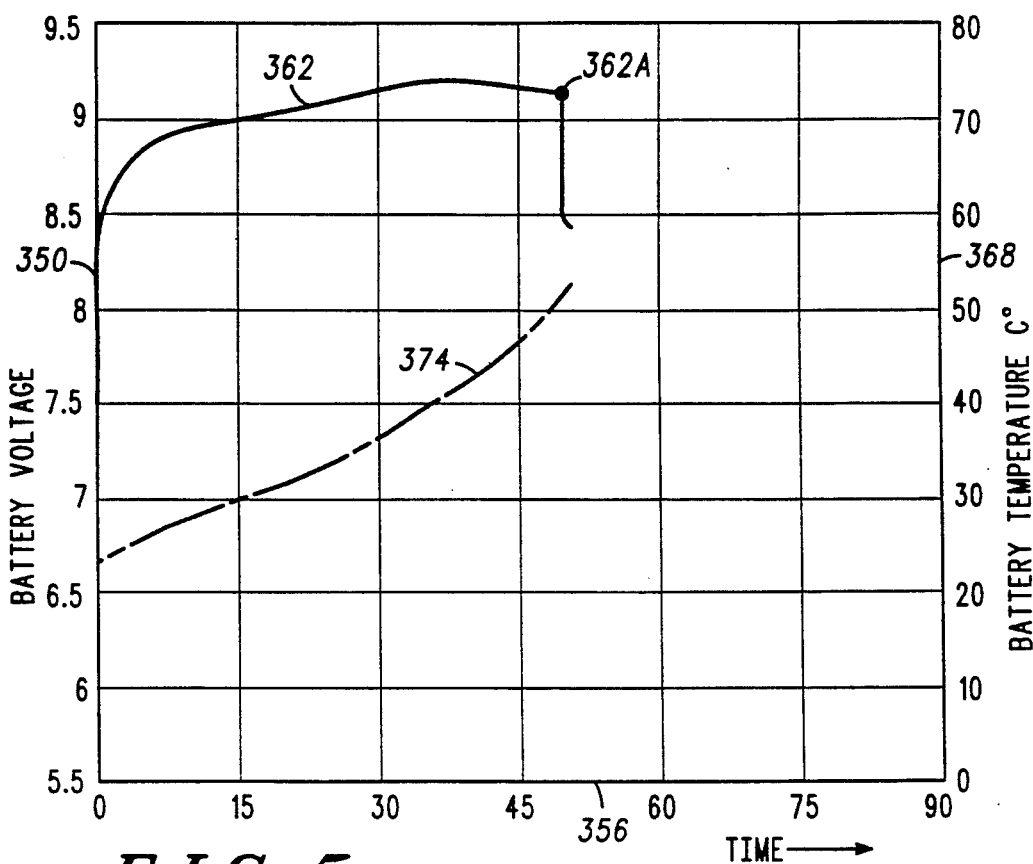
FIG. 4 is a graphical representation of plots of battery voltage levels and battery temperature levels of a rechargeable battery formed of a nickel-cadmium material graphed as a function of time which shows the relationship between battery voltage of the battery and temperature levels of the battery during application of a fast charging current thereto.

Turning now to the graphical representation of FIG. 4, plots of battery voltage levels and battery temperature levels of a conventional, nickel cadmium battery are plotted during application of a fast charging current thereto. First ordinate axis 350, shown at the lefthand side of the Figure, is scaled in terms of voltage levels taken across output terminals of a battery, and abscissa axis 356 is scaled in terms of time, here, specifically, in terms of minutes. Plot 362 is a plot of the voltage levels taken across a battery during application of a fast charging current thereto. Plot 362 is typical of a nickel cadmium battery which typically exhibits an initial, rapid increase in battery voltage, a plateau region at which the rate of voltage increase diminishes, a second increase in the rate of battery voltage increase leading up to a maximum voltage level just prior to full charging of the nickel cadmium battery.

Second ordinate axis 368, shown at the right-hand side of the Figure, is scaled in terms of a temperature value, here degrees centigrade, and plot 374 is a plot of the temperature levels of the nickel cadmium battery during application of the fast charging current thereto. Plot 374 indicates that the temperature levels of the battery generally increases with time during continued application of a fast charging current to the battery. This temperature increase is, at least initially, generally linear and, as illustrated, typically reaches a maximum value of a little under fifty degrees centigrade. As plots 362 and 374 are commonly plotted upon a single time axis, i.e., abscissa axis 356, the relationship between the voltage level across a nickel cadmium battery during the application of a fast charging current thereto and the temperature level of the nickel cadmium battery is clearly evident. As the temperature level of the nickel cadmium battery does not typically exhibit a precipitous rise in temperature during application of the fast charging current thereto, the battery may safely be fully charged by application of a normal fast charging current.

Point 362A of plot 362 indicates a state of full charge, at which time application of a fast charging current is terminated. A conventional battery charger, such as a battery charger operative to terminate application of a fast charging current upon detection of a voltage drop of a predetermined level across output terminals of the battery, may be utilized in most instances to safely recharge a nickel cadmium battery.

Figure 5:
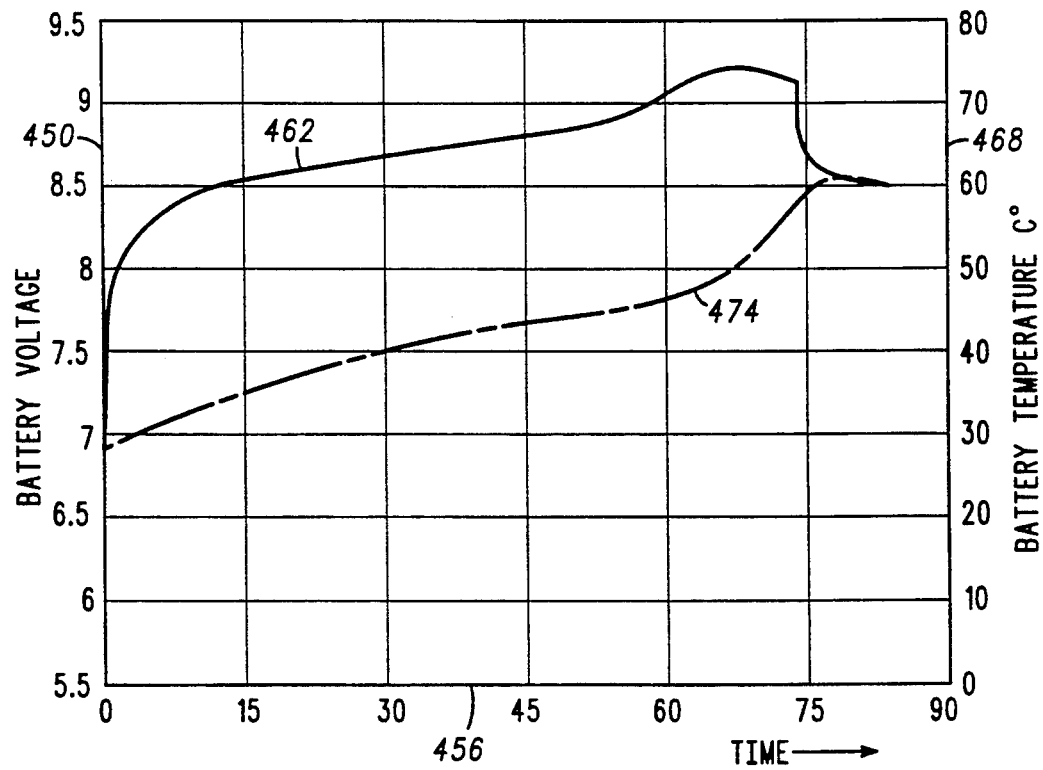
FIG. 5 is a graphical representation of plots of battery voltage levels and battery temperature levels graphed as a function of time, similar to that of FIG. 4, but of a rechargeable battery comprised of a nickel metal hydride material which shows the relationship between voltage levels across the battery and temperature levels of the battery during application of a fast charging current thereto.

Turning now to the graphical representation of FIG. 5, plots of battery voltage levels and battery temperature levels of a nickel metal hydride battery during application of a fast charging current applied by a conventional battery charger are shown. Similar to the graphical representation of FIG. 4, a first ordinate axis, here ordinate axis 450 shown at a left-hand side of the Figure, is scaled in terms of voltage levels taken across output terminals of a nickel metal hydride battery, and abscissa axis, here axis 456, is scaled in terms of time, here in terms of minutes. Plot 462 is a plot of the voltage levels across the output terminals of a nickel metal hydride battery during application of a fast charging current thereto applied by a conventional battery charger. Similar to plot 362 of FIG. 4, plot 462 is of a typical shape of a battery charging curve characterized by an initial, sharp increase in battery voltage, a plateau region, and a decrease of battery voltage just prior to full charging of the battery. The battery charger which applies the fast charging current to the battery to form the plots of FIG. 5 is of a conventional nature and terminates the application of the fast charging current responsive, e.g., to a voltage drop of the voltage across the battery in excess of a predetermined value.

Second ordinate axis 468, shown at the right-side of the Figure, is scaled in terms of battery temperature, here degrees centigrade. Plot 474 is a plot of the temperature levels of the nickel metal hydride battery during application of the fast charging current thereto. As compared with plot 374 of FIG. 4, the temperature increase of the nickel metal hydride battery causes a greater battery temperature level to be reached. As shown in the Figure, a battery temperature level of in excess of sixty degrees centigrade is reached. Such temperature levels of the battery may result in damage to the battery, or shorten the useful life of the battery. Recharging of a nickel metal hydride battery by a conventional battery charger which terminates the application of the fast charging current responsive to detection of a voltage drop across the battery can therefore be disadvantageous. Similarly, a battery charger which terminates the application of a fast charging current responsive to detection of the temperature level of a battery in excess of a predetermined amount can also be disadvantageous as the application of the fast charging current to the battery would be terminated prior to full recharging thereof.

Figure 6:
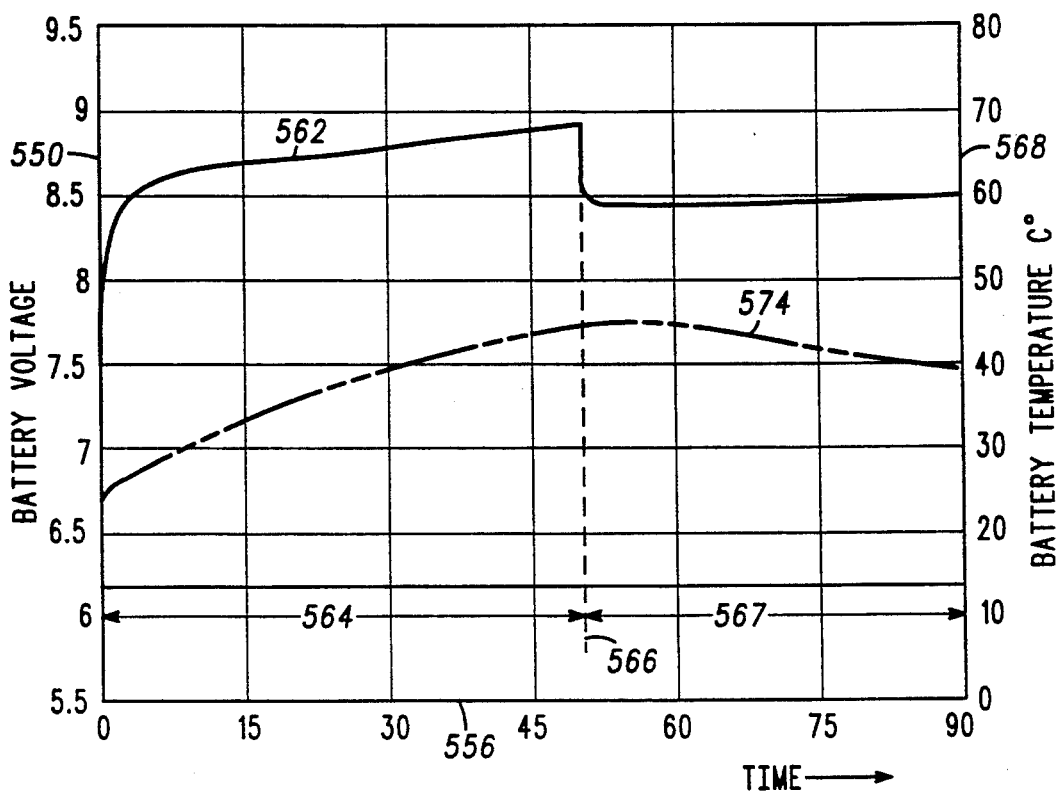
FIG. 6 is a graphical representation of plots of battery voltage levels and battery temperatures, similar to those of FIGS. 4-5, but illustrating the relationship between the voltage levels across a rechargeable, nickel metal hydride battery and the temperature levels of the battery during application of a fast charging current in a conventional, temperature cut-off NiCd battery charger.

Turning now to FIG. 6, a graphical representation of plots of battery voltage levels and battery temperature levels of a nickel metal hydride battery are again shown. Similar to FIGS. 4–5, a first ordinate axis, shown at the left-hand side of the Figure, and here referred to by reference numeral 550, is scaled in terms of voltage levels taken across output terminals of a nickel metal hydride battery. The abscissa axis, here axis 556, is scaled in terms of time, here in terms of minutes. Plot 562 is a plot of battery voltage levels taken across output terminals of a nickel metal hydride battery during application of a charging current thereto. The fast charging current applied to the nickel metal hydride battery is not, however, of a single, constant value, but, rather, is of two different levels. A fast charging current of a first magnitude (such as, for example, 50 milliamperes) is initially applied to the battery. The time period during which the fast charging current of the first magnitude is applied to the battery is indicated in the Figure by line segment 564. An end point of line segment 564 is defined by time $T_1$ which also defines vertically-extending line 566. A fast charging current of a second magnitude is applied to the battery for a second time period, indicated by line segment 567, also having an end point defined by time $T_1$. The magnitude of the second fast charging current is less than the magnitude of the first charging current (and, for example, may be of approximately 40 milliamperes).

A second ordinate axis formed at a right-hand side portion of FIG. 6, and here referred to by reference numeral 568, is scaled in terms of battery temperature, here degrees centigrade. Plot 574 is a plot of the temperature level of a nickel metal hydride battery during application of the two-level fast charging current applied thereto. The left-hand side portion of plot 574 indicates the increase in temperature of the nickel metal hydride battery during application of the fast charging current of the first magnitude thereto. (A similar such increase was also indicated by plot 474 of FIG. 5.) However, because the second, fast charging current is of a reduced magnitude relative to the magnitude of the first charging current, the temperature level of the battery does not continue to increase responsive to application of the fast charging current of the second magnitude. When the magnitude of the charging current of the second magnitude applied to the battery is reduced to a low magnitude such as a current level corresponding to a trickle charging current, the temperature of the battery no longer increases, and, as shown, may even be of a reduced level.

Utilization of this temperature relationship between the magnitude of the charging current applied to the nickel metal hydride battery and the temperature level, and rate of increase thereof, of the battery may be utilized to prevent premature termination of the application of a charging current to the battery. Also, excessive temperature levels of the battery occurring as a result of application of a fast charging current to the battery may be prevented. In particular, by reducing the magnitude of the charging current applied to the battery as the temperature of the battery increases, the rate at which the temperature levels of the battery increases, and the corresponding temperature level of the battery, may be controlled.

Figure 7:
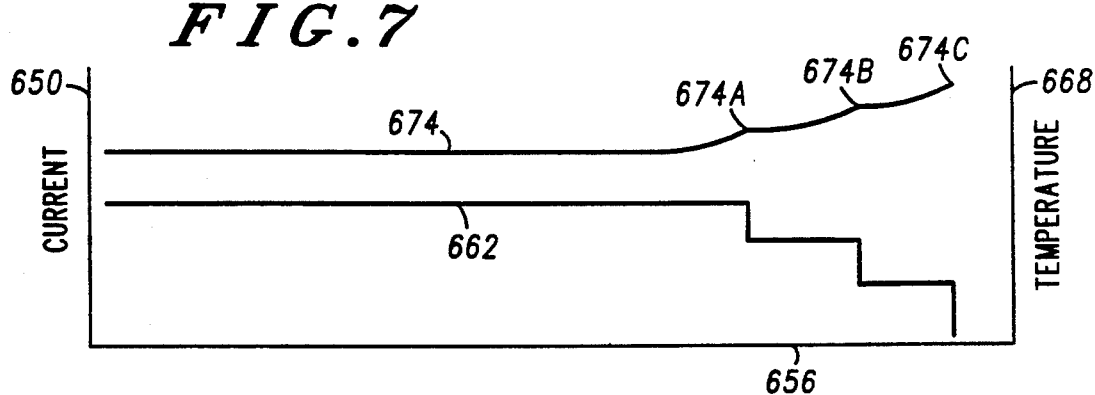
FIG. 7 is a graphical representation of plots of battery temperature and charging current levels applied to a rechargeable battery, such as a nickel metal hydride battery, during operation of the battery charger of a preferred embodiment of the present invention.

Referring now to FIG. 7, a graphical representation of the battery temperature levels and the levels of a charging current applied to a rechargeable battery are shown. First ordinate axis, here axis 650, is scaled in terms of current, here milliamperes (mA). Abscissa axis 656 is scaled in terms of time, here in terms of minutes. The left-hand side of plot 662 illustrates a steady, charging current of a desired charging current level.

A second ordinate axis, here axis 668, is scaled in terms of battery temperature, here degrees centigrade. Plot 674 is a plot of the temperature of the nickel metal hydride battery during application of the charging current (indicated by plot 662) thereto.

A conventional battery charger which terminates the application of a charging current to the battery upon the detection of a temperature level of the battery in excess of a predetermined value would cause termination of the application of the fast charging current when the temperature level of the battery exceeds such predetermined value prior to full-charging of the battery. Rather than completely terminating the application of a fast charging current to the battery, and, instead, by advantageously reducing the level of the magnitude of the fast charging current applied to the battery in a step-wise manner, the rate at which the temperature level of the battery undergoing application of the fast charging current increases may be reduced, and premature charge termination is prevented.

Temperature threshold presets are established in the preferred embodiment of the present invention. Such temperature threshold presets are at temperature levels corresponding to points 674A, 674B, and 674C on plot 674. When the battery temperature level exceeds the temperature level of each temperature preset, the magnitude of the fast charging current is reduced to form the step function of the right-hand side of plot 662.

In such a manner, a fast charging current may be applied to the nickel metal hydride battery without causing the rapid increase in temperature level of the battery. The number of times in which the magnitude of the charging current is stepped-down may be increased, as desired. Although a battery charger encompassing such teachings is particularly advantageous to recharge nickel metal hydride batteries, the battery charger may also be advantageously utilized to recharge batteries comprised of a nickel cadmium, or other, material.

Figure 8:
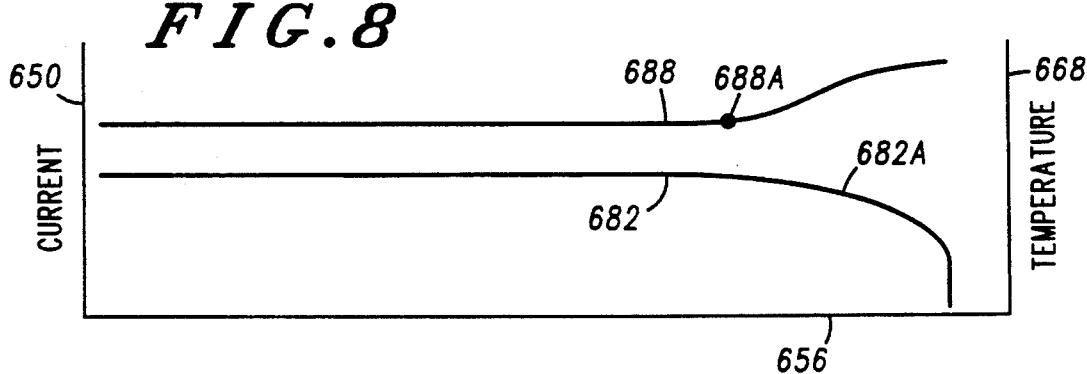
FIG. 8 is a graphical representation of plots of battery temperature and charging current levels applied to a rechargeable battery, similar to that of FIG. 7, but during operation of the battery charger of an alternate, preferred embodiment of the present invention.

FIG. 8 is a plot, similar to that of FIG. 7, which includes similarly-numbered, first and second ordinate axes 650 and 668. The graphical representation of FIG. 8 illustrates an alternate, preferred embodiment of operation of the battery charger of the present invention. Analogous to plot 662 of FIG. 7, plot 682 of FIG. 8 is a plot of the magnitude of the charging current applied to a nickel metal hydride battery, and plot 688 of FIG. 8, analogous to plot 674 of FIG. 7, illustrates the temperature level of a battery during application of a charging current, indicated by plot 682, thereto.

Once the temperature level of a battery exceeds a predetermined temperature level, here indicated by a temperature corresponding to point 688A, the magnitude of the charging current applied to the battery decreases in a continuous, and accelerating, rate of decrease, indicated by curve portion 682A of plot 682. The rate of which the temperature level of the battery undergoing application of the fast charging current thereto is decreased continuously, rather than in the stepwise manner illustrated in FIG. 7. It is noted that, when digital processor circuitry is utilized to cause the reduction in the application of the charging current, curve portion 682A of plot 682 is approximated by a plurality of small steps.

Figure 9:
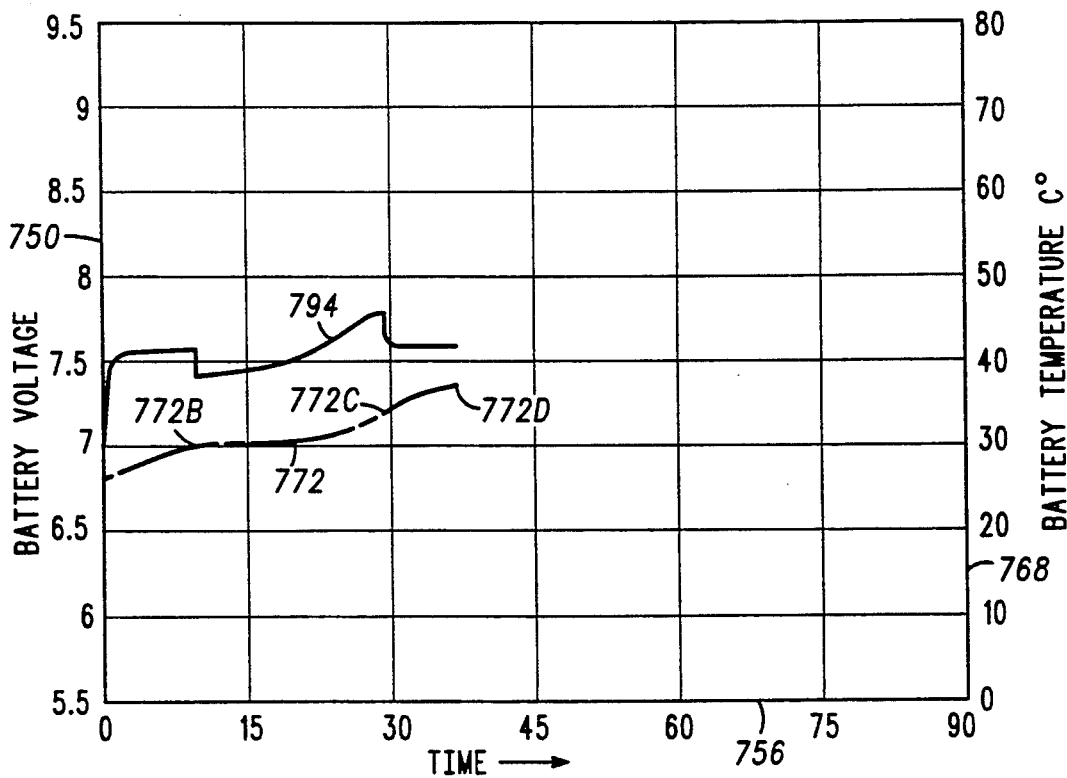
FIG. 9 is a graphical representation of plots of battery voltage levels and battery temperature levels of a rechargeable battery, here a nickel metal hydride battery, during operation of the battery charger of a preferred embodiment of the present invention operative to apply the fast charging current shown graphically in FIG. 7.

FIG. 9 is a graphical representation, similar to those of FIGS. 4–6, of plots of battery voltage and temperature levels, here of a nickel metal hydride rechargeable battery during recharging thereof by a battery charger constructed according to the teachings of the present invention. First ordinate axis 750, shown at the left-hand side of the Figure, is scaled in terms of volts, abscissa axis 756 is scaled in terms of time, here in terms of minutes, and second ordinate axis 768, shown at the right-hand side of the Figure, is scaled in terms of battery temperature, here degrees centigrade.

Plot 772 is a plot of the temperature level of the nickel metal hydride battery during application of a fast charging current thereto, and plot 794 is a plot of voltage levels taken across output terminals of the battery during the same time period. The fast charging current is of three different magnitudes. Initially, a fast charging current of a first magnitude is applied to the battery. Such application of the fast charging current causes a temperature increase of the battery. When a first temperature threshold, here indicated by the temperature corresponding to point 772B, the magnitude of the current level of the current applied to the battery is reduced, and a second fast charging current of a second, and lesser, magnitude is applied to the battery. The rate at which the temperature of the battery increases is reduced, although the temperature of the battery increases.

The fast charging current of the second magnitude is continued until a second temperature threshold, here indicated by the temperature corresponding to point 772C, is exceeded. At such time, the level of the magnitude of the fast charging current applied to the battery is decreased once again, and a third, and yet further reduced, magnitude of fast charging current is applied to the battery. The fast charging current of the third magnitude is continued to be applied to the battery until a third threshold temperature, indicated by temperature corresponding to point 772D is exceeded. At such time, application of a fast charging current to the battery in terminated, and a charging current corresponding to a level of a trickle charging current is applied to the battery.

With reference, again, to the block diagram of battery charger 84 of FIG. 2, an algorithm embodied in processor 180 is operative to control the level at which charging current is applied to a battery positioned in a battery pocket, here, for purposes of illustration, at battery pocket 88. Temperature levels of the battery, as indicated by a thermistor, (such as thermistor 70 of battery pack 20 of FIG. 1) are supplied to temperature measuring apparatus 152 which generates a signal on line 168. The signal generated on line 168 is applied to processor 180 by way of voltage divider 176 on line 168'. When the measured temperature level of the battery exceeds a first temperature threshold, processor 180 generates a signal on line 192 to current regulator 120 to reduce, or to step down in magnitude, the magnitude of the charging current generated on line 128. When the temperature level of the battery, as measured by temperature measuring apparatus 152, exceeds a second temperature threshold, processor 180 generates a signal on line 192 to reduce further, or step-down again, the magnitude of the current generated by current regulator 120 on line 128. When the temperature level of the battery, as measured by temperature measuring apparatus 152, exceeds a third temperature threshold, processor 180 generates a signal on line 192 which causes current regulator 120 to reduce, yet again, the magnitude of the charging current generated on line 128. In the preferred embodiment, when the third temperature threshold is exceeded, the magnitude of the charging current generated by current generator 120 on line 128 is of a value corresponding to a trickle charging current. The values of the temperature threshold, and the numbers thereof may, of course, be altered by appropriate alteration of an algorithm embodied within processor 180.

Figure 10:
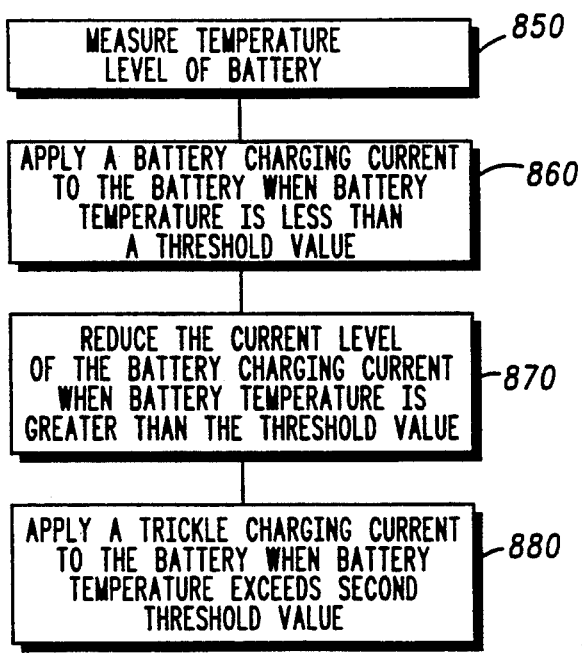
FIG. 10 is a flow diagram illustrating the method steps of the method of a preferred embodiment of the present invention.

Turning now to the flow diagram of FIG. 10, a method for charging a rechargeable battery according to the teachings of a preferred embodiment of the present invention is shown. First, and as indicated by block 850, the temperature level of the battery is measured. Next, and as indicated by block 860, a battery charging current defined by a current level is applied to the battery when the temperature level of the battery is less than a first threshold temperature. Next, and as indicated by block 870, the current level of the battery charging current applied to the battery is reduced when the temperature level of the battery exceeds the first threshold temperature. Finally, and as indicated by block 880, a trickle charging current is applied to the battery when the temperature levels of the battery exceeds a second temperature level.

Figure 11:
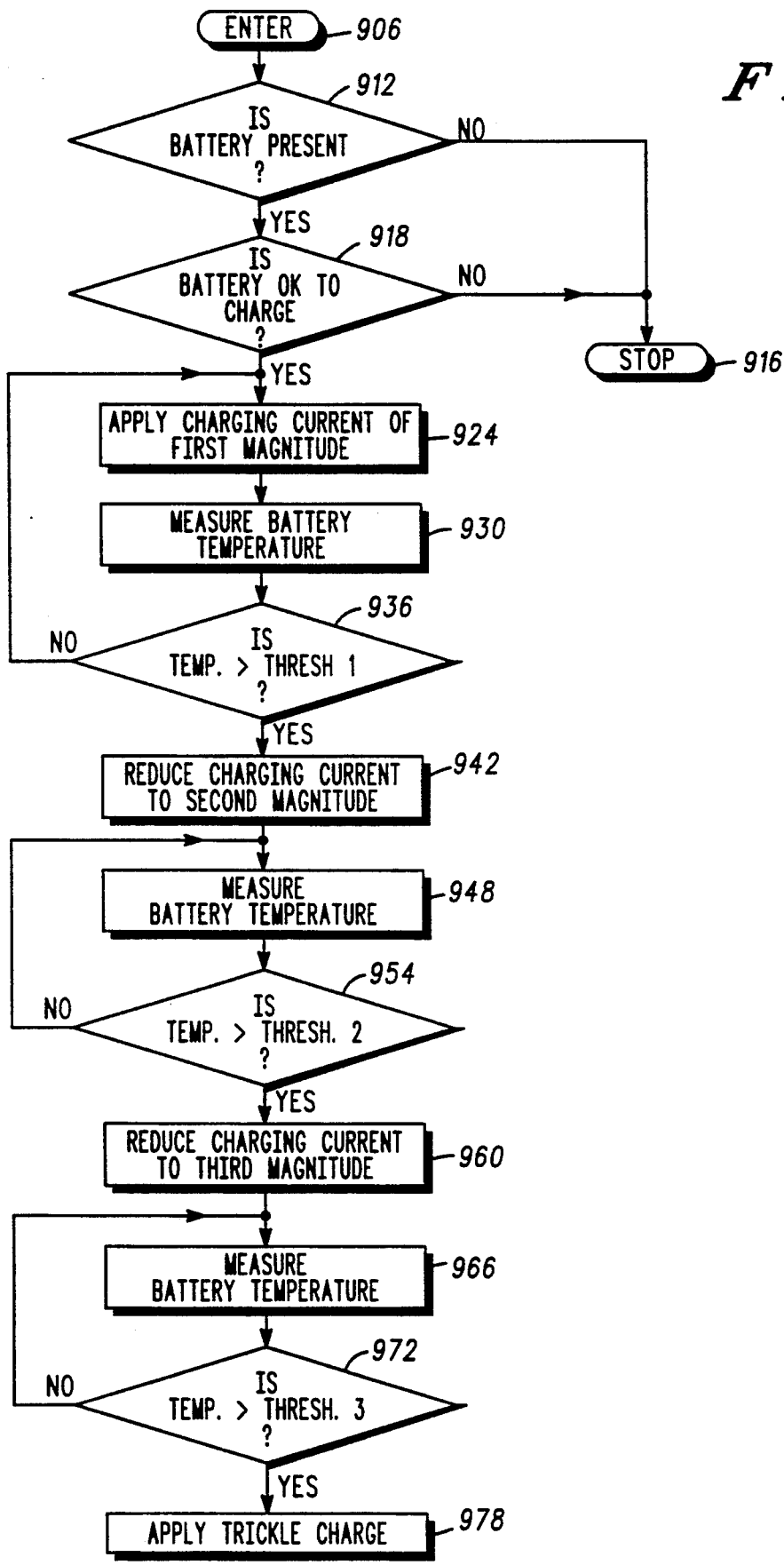
FIG. 11 is a flow diagram of an algorithm embodied by processor circuitry forming a portion of the battery charger of a preferred embodiment of the present invention.

Turning finally now to the flow diagram of FIG. 11, the block diagram of an algorithm of the preferred embodiment of the present invention, and embodied within processor circuitry of a battery charger constructed according to the teachings of the present invention is shown. First, after entering the subroutine, as indicated by block 906, a determination is made, as indicated by decision block 912, whether a battery is present at a battery charging pocket to be charged thereat. If so, the yes branches taken to decision block 918 where a determination is made as to whether the battery positioned at the battery pocket is suitable for recharging. If so, the yes branches taken to block 924, and a fast charging current of a first magnitude is applied to the battery. Next, and as indicated by block 930, the temperature level of the battery is measured.

A determination is made, as indicated by decision block 936, as to whether the temperature level of the battery is in excess of a first threshold value. If the temperature level of the battery is not in excess of the first threshold value, the no branch is taken, and the fast charging current of the first magnitude is continued to be applied to the battery. When the temperature level of the battery exceeds the first threshold level, the yes branch is taken to block 942, whereat the level of charging current applied to the battery is reduced to a second level.

Next, and as indicated by block 948, the temperature of the battery is again measured. A determination is then made as to whether the temperature of the battery is greater than a second threshold level. If the temperature is not in excess of the second threshold temperature, the fast charging current of the second magnitude is continued to be applied to the battery, and the no branch is taken. When the temperature level of the battery exceeds the second threshold temperature, the yes branch is taken, and the magnitude of the charging current applied to the battery is reduced yet again, here to a second reduced magnitude, as indicated by block 960. Next, the temperature level of the battery is again measured, as indicated by block 966, and a determination is made, as indicated by decision block 972, as to whether the temperature level of the battery is in excess of a third threshold temperature. If the temperature level of the battery is less than the third threshold temperature, the charging current of the second, reduced magnitude is continued to be applied to the battery, and the no branch is taken from the decision block 972. When the temperature level of the battery is in excess of the third temperature threshold, the yes branch in taken to block 978 whereat application of the fast charging current is terminated, and a trickle charging current is then applied to the battery.

As the battery charger of the preferred embodiment of the present invention does not cause premature, fast charge termination of a nickel metal hydride battery undergoing application of a fast charging current, a nickel metal hydride battery may be completely recharged. Also, because the battery charger of the present invention terminates application of a fast charging current when the temperature level of the battery exceeds a certain maximum value, damage, or reduced battery life span, of the nickel metal hydride battery is prevented.

While the present invention has been described in connection with the preferred embodiments shown in the various figures, it is to be understood that other similar embodiments may be used and modifications and additions may be made to the described embodiments for performing the same function of the present invention without deviating therefrom. Therefore, the present invention should not be limited to any single embodiment, but rather construed in breadth and scope in accordance with the recitation of the appended claims.

What is claimed is:

1. A battery charger for charging a battery pack formed of at least one battery cell, when the battery pack is positioned for recharging thereat, said battery charger comprising:
   means for measuring a temperature level of the at least one battery cell of the battery pack;
   means for applying a battery charging current defined by a current level to the at least one battery cell when the temperature level of the at least one battery cell measured by said means for measuring is less than a first threshold temperature;
   means for reducing the current level of the battery charging current applied to the at least one battery cell in amounts of current level reduction corresponding to amounts of temperature level increases when the temperature level of the at least one battery cell exceeds the first threshold temperature but is less than a second threshold temperature; and
   means for applying a trickle charging current to the at least one battery cell when the temperature level of the at least one battery cell exceeds the second threshold temperature.

2. The battery charger of claim 1 wherein said means for measuring comprises a thermistor forming a portion of an electrical circuit, wherein said thermistor is positioned in physical proximity to the at least one battery cell.

3. The battery charger of claim 2 wherein said means for measuring further comprises a processor having inputs thereof coupled to receive signals indicative of electrical characteristics of the thermistor, and, hence, the temperature level of the at least one battery cell positioned in the physical proximity thereto, said processor further having an algorithm embodied therein for associating signals received at the inputs thereof with a temperature level of the at least one battery cell.

4. The battery charger of claim 1 wherein said means for applying the battery charging current comprises a variable charging current source coupled across the at least one battery cell.

5. The battery charger of claim 4 wherein said means for reducing the current level comprises a processor having outputs coupled to the variable charging current source, said processor further having an algorithm embodied therein for causing the processor to generate control signals at the outputs thereof for varying the current level of the battery charging current generated by the variable charging current source.

6. The battery charger of claim 5 wherein the algorithm embodied in the processor causes the processor to generate the control signals to reduce incrementally, in a step-wise manner, the current level of the currents generated by the variable battery charging source.

7. The battery charger of claim 6 wherein the algorithm embodied in the processor causes the processor to generate the control signals to cause the battery charging current to vary in three increments to be of a first reduced charging current level, a second reduced charging current level, and a third reduced charging current level.

8. The battery charger of claim 7 wherein the processor generates the control signals to cause the variable charging current source to generate currents of the first reduced charging current level when the temperature level of the at least one battery cell is of a temperature level greater than the first threshold temperature by a first predetermined amount.

9. The battery charger of claim 8 wherein the processor generates the control signals to cause the variable charging current source to generated currents of the second reduced charging current level when the temperature level is greater than the first threshold temperature by a second predetermined amount.

10. The battery charger of claim 9 wherein the processor generates the control signals to cause the variable charging current source to generate currents of the third reduced charging current level when the temperature level of the at least one battery cell is of a temperature level greater than the first threshold temperature by a third predetermined amount.

11. The battery charger of claim 10 wherein the first predetermined amount is less than the second predetermined amount, and the second predetermined amount is less than the third predetermined amount.

12. The battery charger of claim 5 wherein the algorithm embodied in the processor causes the processor to generate the control signals to reduce continuously the current levels of the variable battery charging source responsive to corresponding changes of the temperature levels of the at least one battery cell.

13. The battery charger of claim 12 wherein the control signals generated by the processor to vary continuously the current levels of the battery charging source cause the current levels of the battery charging current generated thereby to be reduced as the temperature level of the at least one battery cell increases during charging thereof.

14. The battery charger of claim 13 wherein the control signals generated by the processor to vary continuously the current levels of the battery charging source to cause the current levels of the battery charging current generated thereby to be reduced until the temperature level of the at least one battery cell exceeds the second threshold temperature.

15. The battery charger of claim 1 wherein said means for applying the trickle charging current to the at least one battery cell comprises a variable charging current source coupled across the at least one battery cell.

16. The battery charger of claim 15 wherein said means for applying a trickle charging current to the at least one battery cell comprises a processor having outputs coupled to the variable charging current source, said processor further having an algorithm embodied therein for causing the processor to generate control signals at the outputs thereof for causing the current level of the battery charging current generated by the variable charging current to be of a current level corresponding to a trickle charging current.

17. The battery charger of claim 1 wherein the first threshold temperature is of a level less than the second threshold temperature.

18. A battery charger for charging a battery pack formed of at least one battery cell when the battery pack is positioned for recharging thereat, said battery charger comprising:

a thermistor positioned proximate to the at least one battery cell of the battery pack, said thermistor forming a portion of an electrical circuit and having electrical characteristics which vary responsive to the temperature thereof, said thermistor for measuring a temperature level of the at least one battery cell;

a variable charging current source coupled across the at least one battery cell for applying a battery charging current defined by a current level to the at least one battery cell when the temperature level of the at least one battery cell is less than a first threshold temperature;

a processor having inputs thereof coupled to receive signals indicative of the electrical characteristics of the thermistor, and, hence, the temperature level of the at least one battery cell positioned in proximity thereto, and outputs thereof coupled to the variable charging current source; and an algorithm embodied in the processor, said algorithm having a portion thereof for associating signals received at the inputs of the processor with a temperature level of the at least one battery cell, and a portion thereof for causing the processor to generate control signals at the output thereof for varying the current level of the battery charging current generated by the variable charging current source whereby the algorithm causes the processor to generate signals to cause the battery charging source to reduce the current level of the battery charging current applied to the at least one battery cell when the temperature level of the at least one battery cell exceeds a first threshold temperature, but is less than a second temperature level, and for applying a charging current of a level corresponding to a trickle charging current when the temperature level of the at least one battery cell exceeds the second threshold temperature.

19. The battery charger of claim 18 wherein the algorithm in the processor causes the processor to generate the control signals to reduce incrementally, in a step-wise manner, the current level of the currents generated by the variable battery charging source.

20. The battery charger of claim 18 wherein the algorithm embodied in the processor causes the processor to generate the control signals to reduce continuously the current levels of the variable battery charging source responsive to corresponding changes of the temperature levels of the at least one battery cell.

21. A method for charging a battery pack comprised of at least one battery cell, said method comprising the steps of:

means for measuring a temperature level of the at least one battery cell;

applying a battery charging current defined by a particular current level to the at least one battery cell when the temperature level of the at least one battery cell measured by said means for measuring is less than a first threshold temperature;

reducing the current level of the battery charging current applied to the at least one battery cell when the temperature level of the at least one battery cell exceeds the first threshold temperature but is less than a second threshold temperature; and applying a trickle charging current to the at least one battery cell when the temperature level of the at least one battery cell exceeds the second threshold temperature.

* * * * *